(12) United States Patent
Fender-Oberle et al.

(10) Patent No.: US 9,822,840 B2
(45) Date of Patent: Nov. 21, 2017

(54) CONVERTER UNIT HAVING A DAMPING SYSTEM AND HAVING A TORQUE TRANSFER UNIT

(71) Applicant: Schaeffler Technologies AG & Co. KG, Herzogenaurach (DE)

(72) Inventors: Vincent Fender-Oberle, Erbstein-Krafft (FR); Thorsten Krause, Buehl (DE); Benjamin Voegtle, Karlsruhe (DE); Stephen-Richard Ainley, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/434,633

(22) PCT Filed: Nov. 21, 2013

(86) PCT No.: PCT/DE2013/200313
§ 371 (c)(1),
(2) Date: Apr. 9, 2015

(87) PCT Pub. No.: WO2014/079443
PCT Pub. Date: May 30, 2014

(65) Prior Publication Data
US 2015/0285330 A1 Oct. 8, 2015

(30) Foreign Application Priority Data
Nov. 22, 2012 (DE) .................. 10 2012 221 343

(51) Int. Cl.
*F16F 15/14* (2006.01)
*F16F 15/131* (2006.01)

(52) U.S. Cl.
CPC .. *F16F 15/13164* (2013.01); *F16F 15/13142* (2013.01); *F16F 15/145* (2013.01)

(58) Field of Classification Search
CPC ............... F16F 15/13164; F16F 15/145; F16F 15/13142
USPC ......... 464/68.2; 192/3.29, 3.31, 201; 60/338
See application file for complete search history.

(56) References Cited

U.S. PATENT DOCUMENTS

| | | | |
|---|---|---|---|
| 6,280,330 B1 * | 8/2001 | Eckel | F16F 15/13142 464/68.2 X |
| 7,975,817 B2 * | 7/2011 | Mueller | F16H 45/02 |
| 8,161,740 B2 * | 4/2012 | Krause | F16F 15/145 60/338 X |

FOREIGN PATENT DOCUMENTS

| CN | 201561090 | 8/2010 |
|---|---|---|
| DE | 10 2006 052144 | 6/2007 |
| DE | 10 2010 006472 | 8/2010 |

* cited by examiner

*Primary Examiner* — Gregory J Binda
(74) *Attorney, Agent, or Firm* — Davidson, Davidson & Kappel, LLC

(57) ABSTRACT

A converter unit having a damping system and having a torque transfer unit for connecting an input shaft separably to an output shaft, wherein the torque transfer unit has a co-rotating housing and the damping system can be installed centered and detachably on the housing is provided. With the converter unit proposed here standard components can be used, which are compact and easily installable.

12 Claims, 3 Drawing Sheets

CONVERTER UNIT HAVING A DAMPING SYSTEM AND HAVING A TORQUE TRANSFER UNIT

The invention relates to a converter unit having a damping system and having a torque transfer unit for connecting an input shaft separably to an output shaft. In particular, the invention relates to a converter unit for a motor vehicle having a friction clutch and/or a torque converter.

BACKGROUND

In motor vehicles or in internal combustion engines, vibrations frequently occur which can put a strain on the drivetrain, and in addition can cause bothersome sounds up to the level of noise for the user. In order to decouple these vibrations insofar as possible from the rest of the drivetrain after they occur, for example in an internal combustion engine, in the existing art damping systems are frequently used together with a torque transfer unit. These damping systems may include centrifugal masses or vibration absorbers, such as a centrifugal force pendulum, for example. The torque transfer unit is set up to connect the input shaft separably to an output shaft, so that torque may be transferred for example from an internal combustion engine to the output shaft, as needed. The output shaft is frequently connected to a shift transmission, by means of which a torque is reduced, increased or reversed.

As a result of the increasing demands on modern motor vehicles, the space conditions for a converter unit are becoming smaller. In particular in motor vehicles, as a result of the increasing number of necessary components, it is necessary to provide a converter unit that takes up as little space as possible. To this end, various configurations have already been proposed in the existing art, but they either have the drawback that a complicated new design of the torque transfer unit is required, or the overall construction is difficult to install.

SUMMARY OF THE INVENTION

The present invention provides a converter unit having a damping system and having a torque transfer unit for connecting an input shaft separably to an output shaft, wherein the torque transfer unit has a co-rotating housing and the damping system can be installed centered and detachably on the housing.

The converter unit proposed here is intended to connect an input shaft to an output shaft separably by means of a damping system and a torque transfer unit. In this case, the input shaft is the transmission output shaft, or is connected to the transmission output shaft. The output shaft is connected to a drivetrain, preferably using a shift transmission. In most conditions the torque runs from the input shaft to the output shaft. The process may also be reversed, however, for example when a motor vehicle is operating in compression mode. The torque transfer unit connects the input shaft to the output shaft, for example by means of a friction clutch, in which two friction surfaces are pressed against each other and thus enable a transfer of torque as a result of the friction forces. The torque transfer unit may also be a torque converter, which enables the transfer of torque with almost no loss, for example using turbine blades, by means of a transmission fluid. It should be pointed out here that the torque transfer unit and the co-rotating housing which encloses it may be a torque transfer unit of the existing art. The damping system is set up to damp vibrations of the drive unit, but also of the drivetrain, or even to cancel them out; the damping system may likewise be a known damping system. It is now proposed here that the damping system and the housing are coordinated with each other in such a way that they can be centered with each other, and thus can rotate (virtually) free of imbalances while coupled. In particular, the torque transfer unit in this case may already be to a great extent completely assembled, and the damping system may likewise be nearly completely assembled. Thus both the damping system and the torque transfer unit may be produced on the existing production lines, without changes to these components being necessary. After or during the centering process, the damping system may be mounted detachably on the housing; this may be carried out, for example, by means of threaded connections. Plug connections or clamp connections may also be used, however. Thus it is possible to assemble a converter unit including damping system which is very compact and easy to install, while also being easily centered with a drive unit. A difficulty which has stood in the way up to now was that with such a design the chain of connecting elements became very long, and therefore a large accumulation of production tolerances and assembly tolerances had to be expected. This has been impossible up to now, because of the high demands for balance tolerance, and at the same time the need to keep production costs low. In one possible embodiment, it is therefore proposed that the damping system be centered with the housing by means of a centering pin, so that the chain of connecting elements is kept short and no impairment of assembly precision and imbalance comes about. In another variant, centering is performed in the bearing area of a flywheel of the damping system. Either the housing or the flywheel is used here as a centering device.

According to another preferred embodiment of the converter unit, an adapter device is provided which may be situated between the housing and the damping system.

An adapter device has in particular installation receptacles for the damping system or the housing. By particular preference, the adapter device is a metal plate which has corresponding receptacles for detachable installation, for example a through hole or a threaded hole. In particular, the adapter device makes an intermediate shaft piece between the damping system and the torque transfer unit superfluous, although the damping system and the torque transfer unit originally are not set up to connect directly to each other. The adapter device is designed in particular as a centering device or pin in the support system.

According to another preferred embodiment of the converter unit, the damping system has a first flywheel and a second flywheel, which are spring-connected to each other by means of a spring system, and where the damping system is connectible to the housing through the first flywheel.

According to this preferred embodiment, the first and second flywheels are spring-connected to each other in such a way that vibrations of the drive unit of the drivetrain that do not fall within the resonance range of the first and/or second flywheel are damped out. Preferably, the first flywheel and the second flywheel vibrate in opposite directions in this case. By particular preference, the first flywheel and the second flywheel, together with the spring system, form a dual-mass flywheel, such as is known in the existing art. In this preferred embodiment, only the first flywheel is adapted in such a way that a direct connection between the damping system and the torque transfer unit is made possible. The other components can remain (nearly) unchanged in this case. With the exception of a receiving part, for example an adapter or adapter device, the other components of the converter unit can remain unchanged. In particular, the first flywheel and the co-rotating housing or the adapter device together form a centering device, in which one of the two components forms the pin and the other the receptacle.

According to another preferred embodiment of the converter unit, the damping system includes a centrifugal force pendulum.

The provision of a centrifugal force pendulum in the damping system makes it possible to cancel out certain frequencies. In particular, gaps can be provided between the individual pendulum masses of the centrifugal force pendulum, for example three pendulum masses distributed around the circumference of a flywheel, for installation and/or for a centering device. In particular, good installation accessibility can be achieved through a slight adjustment of the centrifugal force pendulum. By particular preference, access by means of a ratchet wrench and socket is possible.

According to another preferred embodiment of the converter unit, the damping system is set up to absorb an axial force coming from the torque transfer unit, in particular by means of a laterally braced ball bearing.

In the existing art, the damping systems have heretofore been situated separately from the axial force occurring in the torque transfer unit from the power stream. Such an axial force occurs, for example, with the pressing of a frictional partner of a friction clutch, or through the vane arrangement of a torque converter. This necessitated a complex construction requiring a large construction space. Due to the arrangement of a ball bearing, in particular an angular ball bearing, in the rotational center of the damping system, the elements of the damping system can perform their task—namely damping—free of influence, and at the same time can absorb and pass along axial forces coming from the torque transfer unit. The frictional influence in this case is acceptable. In particular, the centering of the damping system to the co-rotating housing or to the adapter device is undertaken in the area of the ball bearing.

According to another preferred embodiment of the converter unit, the torque transfer unit and the damping system, together in the assembled state, can be centered and installed on an input shaft.

According to this preferred embodiment, the damping system and the torque transfer unit can be assembled together in such a way that the input shaft can be centered and installed later. This enables the converter unit, which is constructed very compactly and from known standard components, to be pre-assembled, and subsequently to be centered and assembled with the input shaft with little susceptibility to error. In particular, the respective processes of centering the damping system with the torque transfer unit and the converter unit with the input drive are both simplified.

According to another aspect of the invention, a drive system to generate propulsion is proposed which has a drive unit, a torque transfer unit and a damping system, where the drive unit has an output shaft to which the damping system can be connected, the damping system and the torque transfer unit being assembled into a converter unit according to one of the preceding claims.

The drive system is preferably a drive system of a motor vehicle. To this end, the drive system has, along with other components, a drive unit, a torque transfer unit and a damping system. The drive unit here may be an internal combustion engine or an electric motor. As already described above, the torque transfer unit may be a torque transfer unit of the existing art, and the damping system may also be a damping system of the existing art. In this case, the drive unit has an output shaft, for example a crankshaft of an internal combustion engine, by means of which a torque may be delivered by the drive unit. To this end, the damping system and the torque transfer unit must be centered. In the existing art, to this end, first the damping system was centered with the drive unit or with the output shaft, and then the torque transfer unit with the centered damping system and the output shaft. Such steps are very complex, particular during final assembly, because a multitude of components may always be in the way which can hinder the complex centering process. It is proposed here that the damping system and the torque transfer unit are assembled already in advance into a converter unit according to the above description, because these parts are already centered to each other. Besides simplifying the final assembly, such a pre-assembly has the benefit that the damping system and the torque transfer unit can be installed more compactly together.

A motor vehicle is proposed, having a drive unit with an output shaft, a drivetrain and a converter unit according to the above description, to connect the output shaft separably to the drivetrain, where the converter unit can be connected to the output shaft after being preassembled.

Most motor vehicles today have front wheel drive, and therefore by preference position the drive unit, for example an internal combustion engine or an electric motor, in front of the driver's compartment and transversely to the main direction of travel. The construction space is especially tight, particularly in such an arrangement, and it is therefore particularly advantageous to use a clutch of smaller size.

The construction space situation becomes more critical in the case of passenger cars of the small car class according to European classification. The assemblies used in a passenger car of the small car class are not significantly smaller compared to passenger cars of larger classes. Nevertheless, the available construction space is substantially smaller in small cars. The converter unit described above combines simplified assembly and the use of already known components with little total construction space. Passenger cars are classified in a vehicle class, for example, according to size, price, weight and power, this definition being subject to constant change according to the needs of the market. In the US market, vehicles of the small car and smallest car classes according to European classification are classified as subcompact cars, and in the British market they correspond to the class of super minis, for example the city car class. Examples of the smallest car class are a VOLKSWAGEN FOX or a RENAULT TWINGO. Examples of the small car class are an ALFA ROMEO MITO, VOLKSWAGEN POLO, FORD FIESTA or RENAULT CLIO.

The features listed individually in the patent claims can be combined with each other in any technologically reasonable way, and can be supplemented by explanatory facts from the description and details from the figures, in which case additional variant embodiments of the invention will be shown.

BRIEF DESCRIPTION OF THE DRAWINGS

The invention as well as the technical environment will be explained in greater detail below on the basis of the figures. The figures show especially preferred exemplary embodiments, to which the invention is not limited however. In particular, it must be pointed out that the figures, and especially the depicted size proportions, are only schematic. The figures show the following.

DETAILED DESCRIPTION

Figure 1:
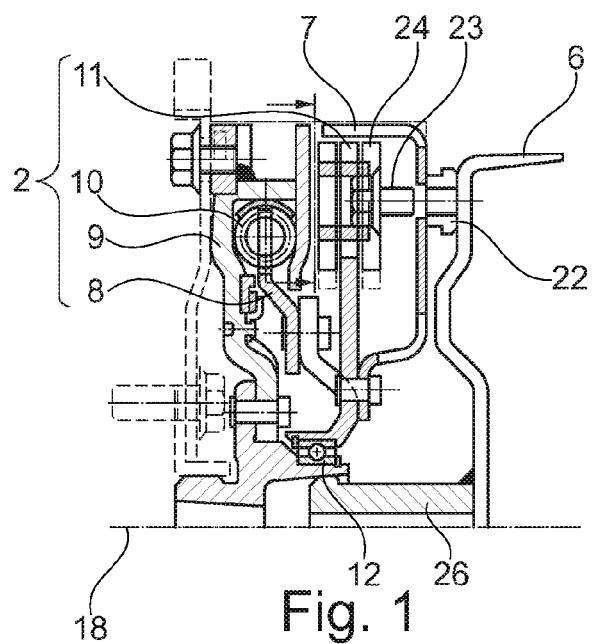
FIG. 1: an installation arrangement of a damping system on a co-rotating housing.
Figure 2:
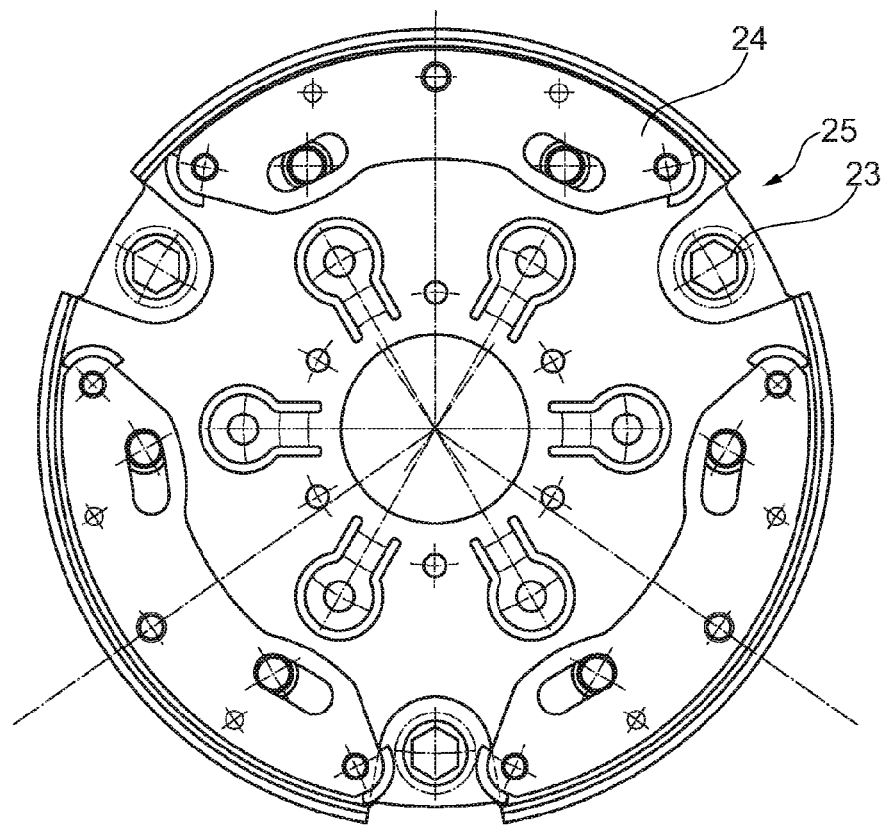
FIG. 2: a section of the view in FIG. 1.

FIG. 1 shows a damping system 2 which has a first flywheel 8, a second flywheel 9 and a spring system 10, as well as a centrifugal force pendulum 11. An adapter device 7 is connected to the first flywheel 8, and together with an attaching screw 23 forms a receptacle 22 on the co-rotating housing 6 of the torque transfer unit 3. In this depiction, the fastening screw 23 is not yet inserted into the receptacle 22. In this view, the fastening screw 23 is in front of the pendulum mass 24 of the centrifugal force pendulum 11 in a recess 25, which is depicted in FIG. 2. The first flywheel 8 is supported by means of a ball bearing 12 in such a way that an axial force can be absorbed or transmitted along the axis of rotation 18. The damping system 2 is centered with the co-rotating housing 6 by means of a centering pin 26, so that the chain of connecting elements is kept short and no impairment of assembly precision and imbalance comes about.

FIG. 2 shows a rotated sectional view which is indicated by arrows between the pendulum mass 24 and the first flywheel 8 in FIG. 1. Visible here is a pendulum mass 24, and a fastening screw 23, which facilitates installation in a recess 25 between pendulum masses.

Figure 3:
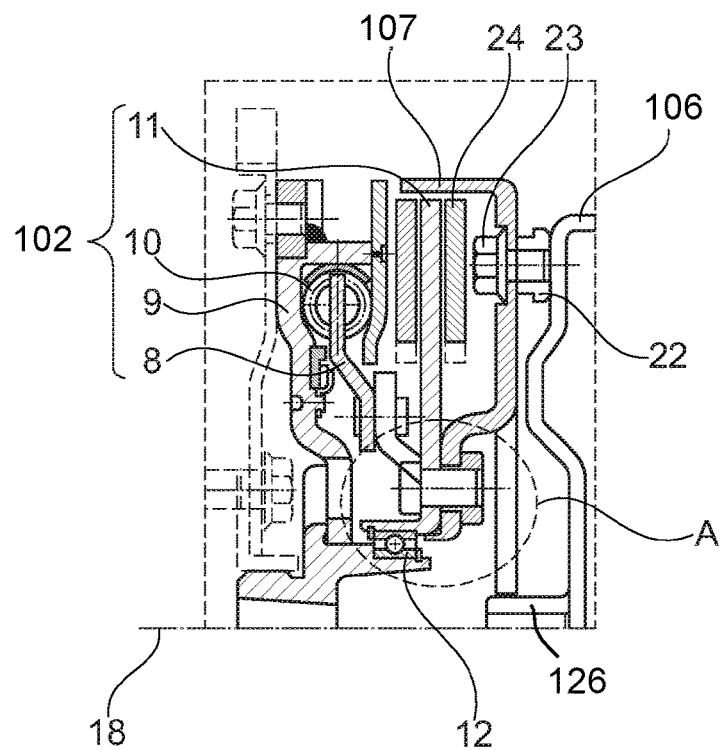
FIG. 3: an alternative arrangement of the damping system on a co-rotating housing.

FIG. 3 shows an alternative arrangement similar to FIG. 1, but with a differently configured adapter device 107 and centering pin 126. The adapter device 107 is situated on the co-rotating housing 106, and a damper system 102 is centered and installed on the adapter.

Figure 4:
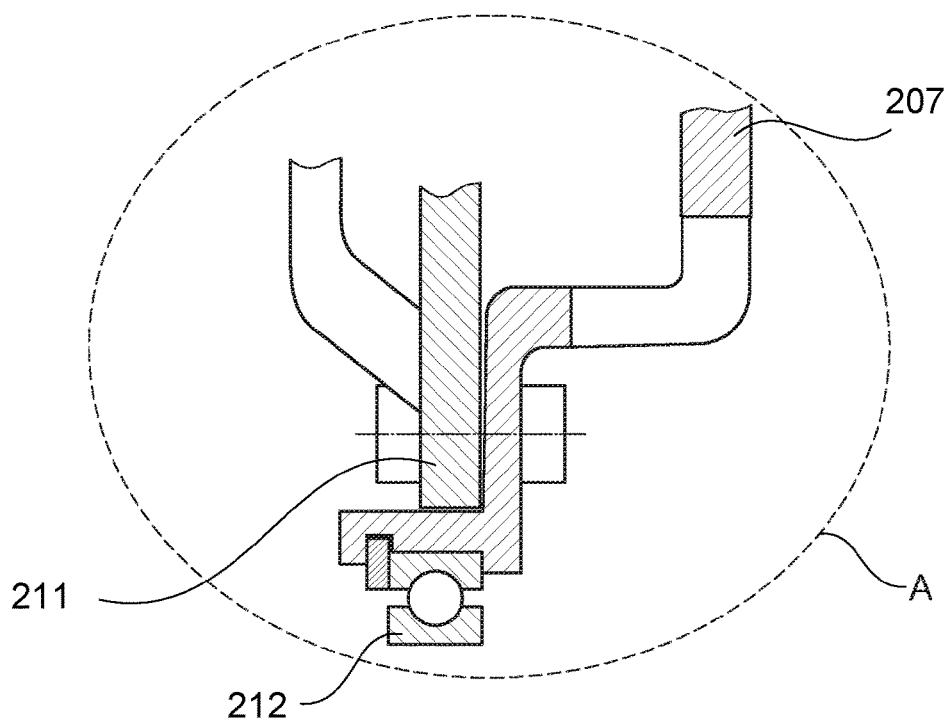
FIG. 4: another possible arrangement of the damping system on the rotating housing.

FIG. 4 shows a cutaway (Section A) of an alternative arrangement of the embodiment of FIG. 3, which in other respects is identical to the construction of FIG. 3. In contrast to the preceding construction, the first flywheel 8 (FIG. 3) is connected to an adapter device 207 via a centrifugal force pendulum 211, which is supported by means of a ball bearing 212. In other words, instead of flywheel 8 resting on ball bearing 12 via centrifugal force pendulum 11 in FIGS. 1 and 3, in FIG. 4, adapter device 207 rests on ball bearing 212. The co-rotating housing 6 is thus supported on ball bearing 212 directly by means of the adapter device 207, and not indirectly by means of centrifugal force pendulum 11, as in FIGS. 1 and 3.

Figure 5:
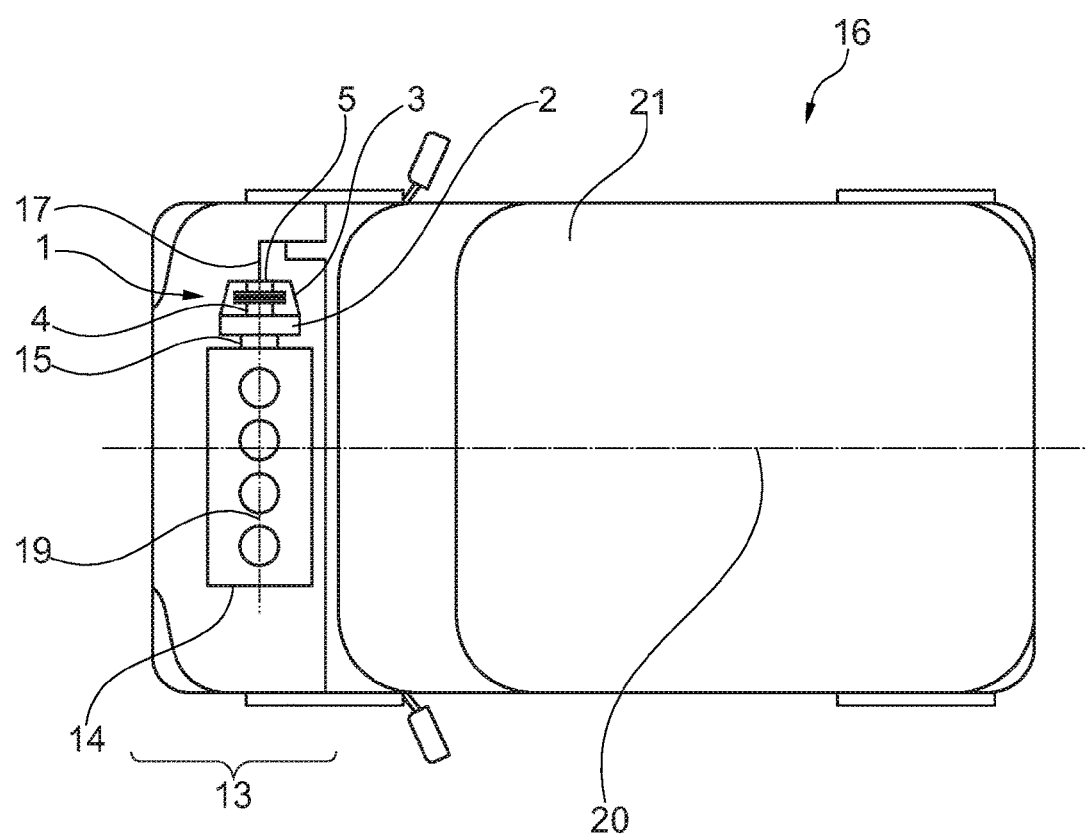
FIG. 5: a motor vehicle having a drive system and a converter unit.

FIG. 5 shows a schematic view of a motor vehicle 16, which has a drive system 13 with a converter unit 1. The drive system 13 has a drive unit 14, which is connected through its output shaft 15 with the converter unit 1 to a drivetrain 17, depicted purely schematically. In this case, the converter unit 1 has a damper system 2 and a torque transfer unit 3. In the torque transfer unit 3 an input shaft 4 and an output shaft 5 are provided, which are connectible with each other, for example, by means of a friction clutch, so that a torque can be transmitted from the internal combustion engine 14 to the drivetrain 17. The drive unit 14 is located ahead of the driver's compartment 21 of the motor vehicle 16, and with its engine axis 19 transverse to the longitudinal axis 20 of the motor vehicle.

With the converter unit proposed here standard components can be used, which are compact and easy to install.

REFERENCE LABELS 1 converter unit
2 damping system
3 torque transfer unit
4 input shaft
5 output shaft
6 housing
7 adapter device
8 first flywheel
9 second flywheel
10 spring system
11 centrifugal force pendulum
12 ball bearing
13 drive system
14 drive unit
15 output shaft
16 motor vehicle
17 drivetrain
18 axis of rotation
19 engine axis
20 longitudinal axis
21 driver's compartment
22 receptacle
23 fastening screw
24 pendulum mass
25 recess
26 centering pin
102 dampening system
106 co-rotating housing
107 adapter device
126 centering pin
207 adapter device
211 centrifugal force pendulum
212 ball bearing

What is claimed is:

1. A converter unit comprising:
a damping system; and
a co-rotating torque transfer unit housing, the damping system installable centered and detachably on the torque transfer unit housing; the damping system including a centrifugal force pendulum; and
an adapter device including a radially extending section positioned axially between a front axially facing surface of the torque transfer unit housing and masses of the centrifugal force pendulum, the adapter device being configured for transmitting torque from the damping system to the torque transfer unit housing, the adapter device being fastened to the torque transfer unit housing at the radially extending section by first fasteners.

2. The converter unit as recited in claim 1 wherein the damping system has a first flywheel and a second flywheel, the first and second flywheels spring-connected to each other via a spring system, the damping system connectible to the torque transfer unit housing through the first flywheel.

3. The converter unit as recited in claim 1 wherein the damping system is connected to the torque transfer unit housing by the adapter device.

4. The converter unit as recited in claim 3 wherein the damping system includes a ball bearing, the centrifugal force pendulum and adapter device axially connecting the torque transfer unit housing to the ball bearing.

5. The converter unit as recited in claim 1 wherein the torque transfer unit and the damping system, together in an assembled state, are connectable to an output shaft of an internal combustion engine.

6. A drive system to generate propulsion, comprising:
the converter unit as recited in claim 1; and
a drive unit, the drive unit has an output shaft, the damping system connectible to the output shaft.

7. A motor vehicle comprising:
the drive system as recited in claim 6; and
a drivetrain, the converter unit connecting the output shaft to the drivetrain.

8. The converter unit as recited in claim 1 wherein the torque transfer unit housing is a torque converter housing.

9. The converter unit as recited in claim 1 wherein the torque transfer unit housing includes a centering pin protruding axially into the damping system, the damping system being centered with the torque transfer unit housing via the centering pin.

10. The converter unit as recited in claim 1 wherein the adapter device includes an outer section positioned radially outside of the centrifugal force pendulum.

11. The converter unit as recited in claim 1 wherein the first fasteners each include a receptacle on the torque transfer unit housing and a fastening screw inserted through the adapter device and into the receptacle.

12. The converter unit as recited in claim 1 wherein the adapter device is fastened to the centrifugal force pendulum by second fasteners, the first fasteners being radially outward with respect to the second fasteners.

\* \* \* \* \*